(12) United States Patent
Austin et al.

(10) Patent No.: US 11,024,197 B2
(45) Date of Patent: Jun. 1, 2021

(54) ROBOTICS AND COMPUTING LEARNING PLATFORM WITH MULTI-LEVEL PROCESSING ARCHITECTURE

(71) Applicant: Trashbots, Inc., Austin, TX (US)

(72) Inventors: Paul Austin, Austin, TX (US); Rohit Srinivasan, Austin, TX (US); Sidharth Srinivasan, Austin, TX (US)

(73) Assignee: Trashbots, Inc., Austin, TX (US)

( * ) Notice: Subject to any disclaimer, the term of this patent is extended or adjusted under 35 U.S.C. 154(b) by 7 days.

(21) Appl. No.: 16/536,077

(22) Filed: Aug. 8, 2019

(65) Prior Publication Data

US 2020/0051458 A1   Feb. 13, 2020

Related U.S. Application Data

(60) Provisional application No. 62/717,222, filed on Aug. 10, 2018.

(51) Int. Cl.
  *G09B 19/00* (2006.01)
  *B25J 9/08* (2006.01)
  *F16H 57/00* (2012.01)
  *B25J 9/10* (2006.01)

(52) U.S. Cl.
  CPC .......... *G09B 19/0053* (2013.01); *B25J 9/08* (2013.01); *B25J 9/102* (2013.01); *F16H 57/00* (2013.01)

(58) Field of Classification Search
  CPC ........ G06F 1/1675; G06F 1/181; G06F 1/633; G09B 23/182; G09B 23/185; G09B 19/00; G09B 19/0053; B25J 9/1617; A63H 33/088; A63H 33/108
  See application file for complete search history.

(56) References Cited

U.S. PATENT DOCUMENTS

| | | | | | |
|---|---|---|---|---|---|
| 3,611,621 | A | * | 10/1971 | Folson | A63H 33/08 446/125 |
| 4,823,532 | A | * | 4/1989 | Westerburgen | A63H 33/08 446/122 |
| 5,061,219 | A | * | 10/1991 | Glickman | A63H 33/101 446/126 |
| 5,238,438 | A | * | 8/1993 | Glickman | A63H 33/101 446/120 |
| D376,855 | S | * | 12/1996 | Leung | D25/119 |
| D382,463 | S | * | 8/1997 | Cloud | D8/354 |
| D393,417 | S | * | 4/1998 | Glickman | D8/382 |
| 6,648,715 | B2 | * | 11/2003 | Wiens | A63H 33/062 446/121 |
| 6,676,474 | B2 | * | 1/2004 | Glickman | A63H 33/062 446/120 |

(Continued)

*Primary Examiner* — Jake Cook
*Assistant Examiner* — T. Scott Fix

(57) ABSTRACT

A computing and robotics learning platform includes a component ecosystem with gears, pucks, side plates and connectors configured to support the integration of globally available materials, such as rubber bands, pencils and popsicle sticks is described herein. Certain embodiments according to this disclosure include a platform device comprising a multi-layer processing structure capable of implementing student programs written in beginner or high-level programming languages without latency or performance degradation from processing tasks associated with low-level system functions, such as motor encoding.

8 Claims, 12 Drawing Sheets

(56) References Cited

U.S. PATENT DOCUMENTS

| | | | |
|---|---|---|---|
| 6,857,707 B2 * | 2/2005 | Guile | B60B 33/0028 |
| | | | 301/5.23 |
| 6,877,574 B2 * | 4/2005 | Thompson | B25J 5/007 |
| | | | 180/65.1 |
| D588,208 S * | 3/2009 | Sinisi | D21/502 |
| D641,611 S * | 7/2011 | Minayoshi | D8/354 |
| 8,260,459 B2 * | 9/2012 | Herbert | B62D 57/02 |
| | | | 700/245 |
| D683,099 S * | 5/2013 | Wright | D34/10 |
| 8,495,850 B1 * | 7/2013 | Lin | E04B 2/18 |
| | | | 52/592.6 |
| D711,974 S * | 8/2014 | Norman | D21/491 |
| D756,937 S * | 5/2016 | Landqvist | D13/155 |
| D787,380 S * | 5/2017 | Karol | D12/123 |
| 9,682,479 B2 * | 6/2017 | Lin | B25J 9/1676 |
| D817,371 S * | 5/2018 | Karol | D15/148 |
| D817,372 S * | 5/2018 | Karol | D15/148 |
| D818,015 S * | 5/2018 | Karol | D15/138 |
| D824,971 S * | 8/2018 | Karol | D15/148 |
| D825,631 S * | 8/2018 | Karol | D15/148 |
| D828,235 S * | 9/2018 | Kittrell, Jr. | D12/123 |
| D829,627 S * | 10/2018 | Hunt | D12/204 |
| 10,398,999 B2 * | 9/2019 | Cochella | A63H 33/044 |
| 10,493,371 B2 * | 12/2019 | Cochella | A63H 33/101 |
| D877,263 S * | 3/2020 | Cochella | D21/484 |
| 10,682,581 B2 * | 6/2020 | Bach | A63H 33/062 |
| 2004/0193318 A1 * | 9/2004 | Ito | B25J 9/06 |
| | | | 700/245 |
| 2006/0048475 A1 * | 3/2006 | Lin | A63H 33/088 |
| | | | 52/589.1 |
| 2006/0134978 A1 * | 6/2006 | Rosen | A63H 33/042 |
| | | | 439/581 |
| 2008/0129239 A1 * | 6/2008 | Lee | B25J 9/08 |
| | | | 318/568.11 |
| 2014/0308872 A1 * | 10/2014 | Petillo | A63H 33/088 |
| | | | 446/127 |
| 2016/0005331 A1 * | 1/2016 | Ryland | F16H 1/12 |
| | | | 434/118 |
| 2016/0339351 A1 * | 11/2016 | Akishbekov | A63H 33/108 |
| 2017/0221383 A1 * | 8/2017 | Karol | G09B 19/0053 |
| 2017/0282091 A1 * | 10/2017 | Wang | H01R 13/6271 |
| 2020/0188807 A1 * | 6/2020 | Xiong | A63H 33/042 |
| 2020/0230513 A1 * | 7/2020 | Chao | A63H 33/108 |
| 2020/0276509 A1 * | 9/2020 | Luo | A63H 33/084 |

* cited by examiner

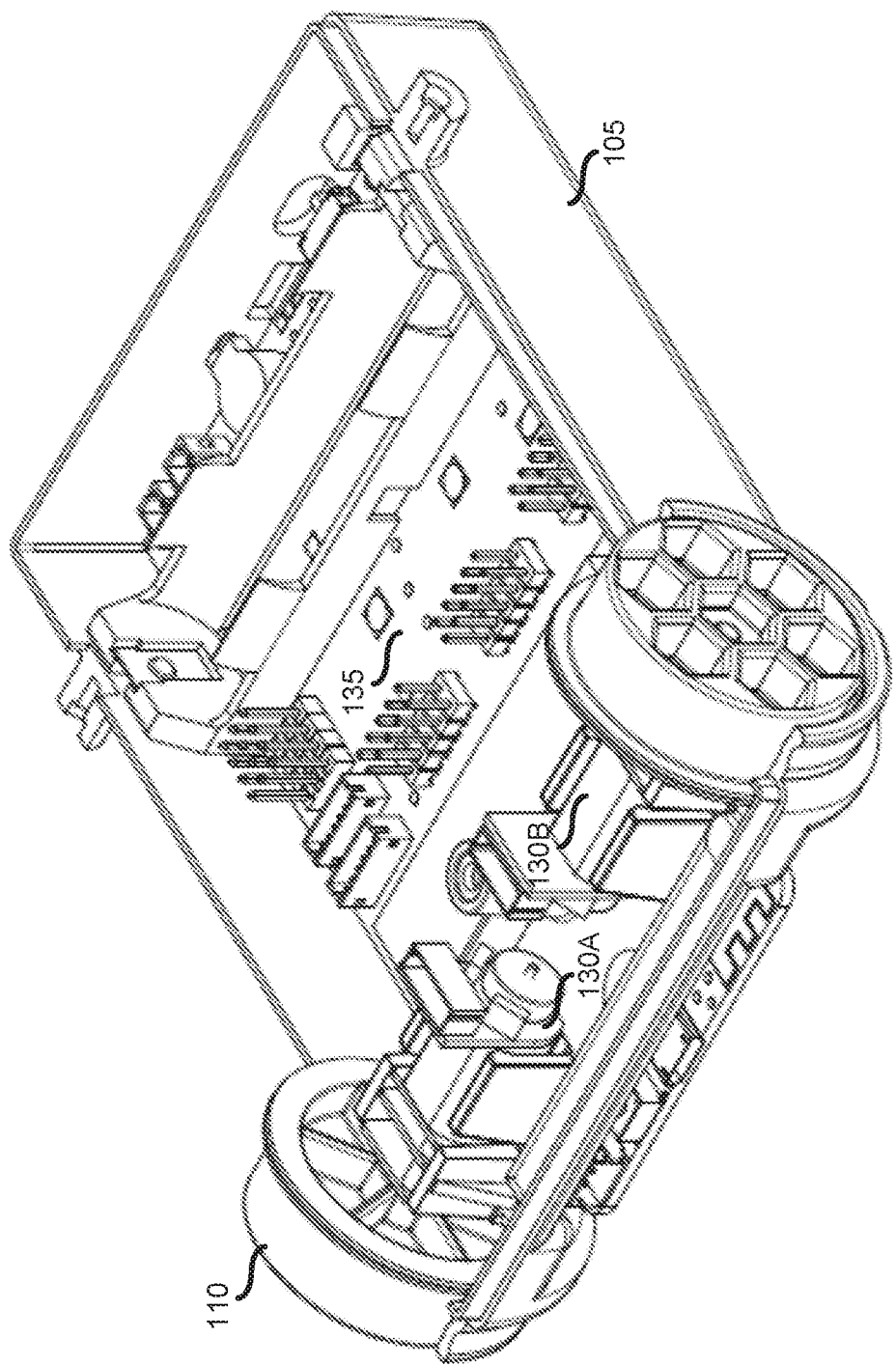

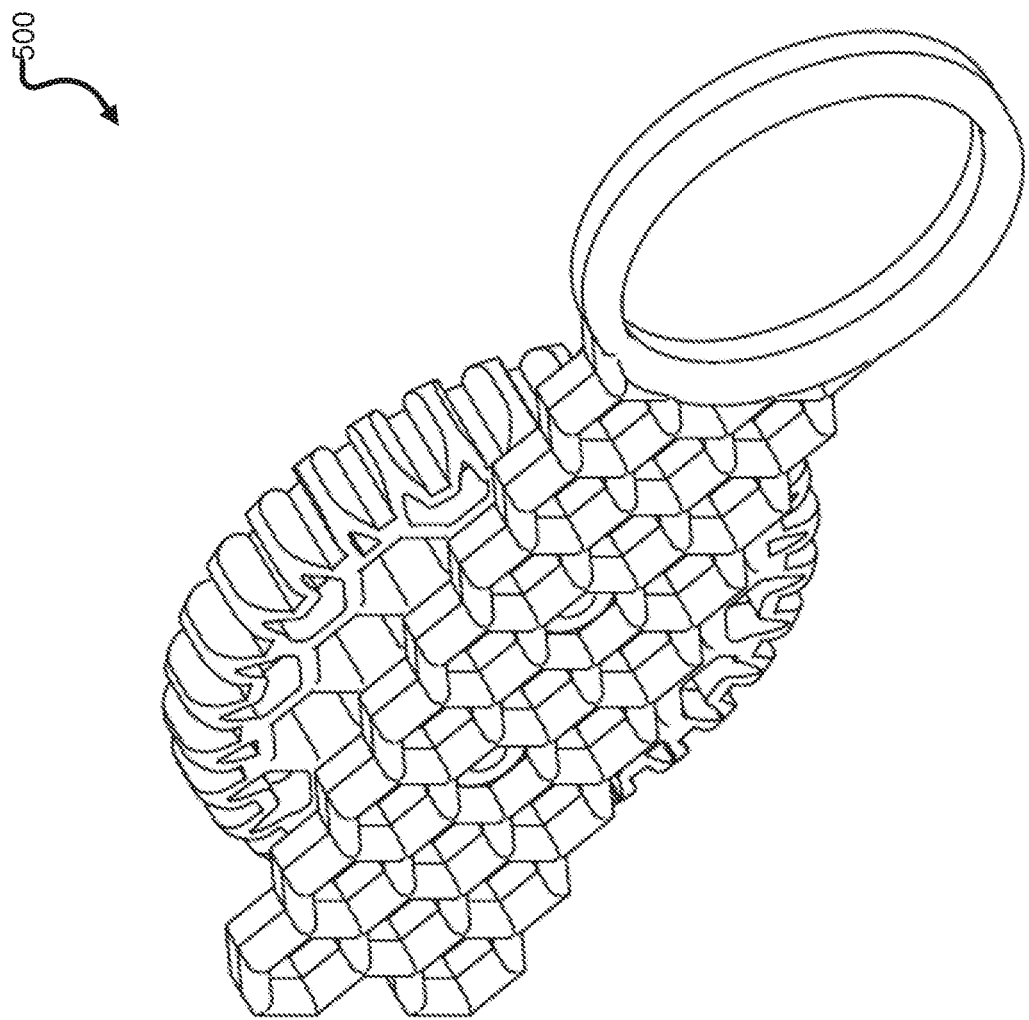

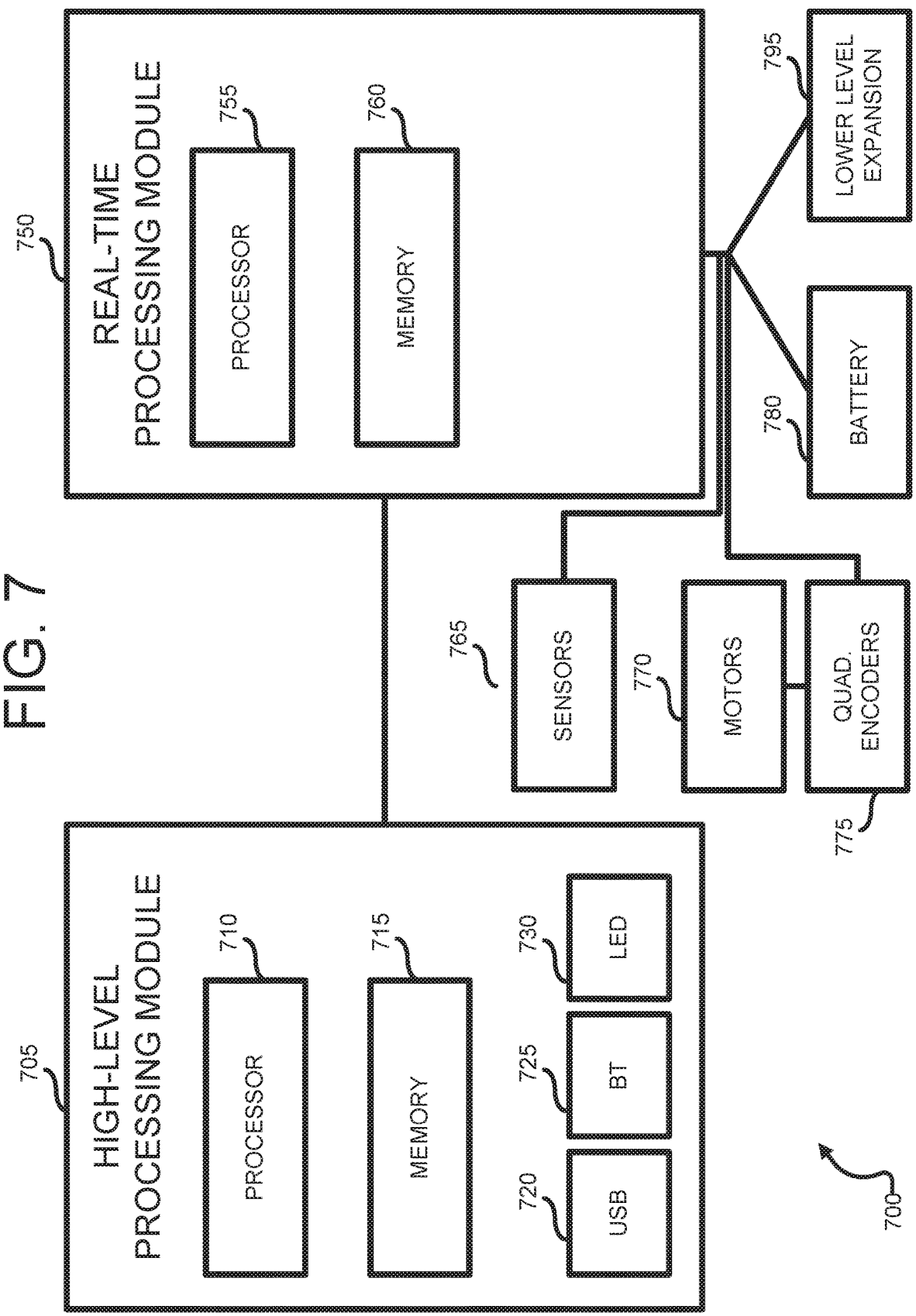

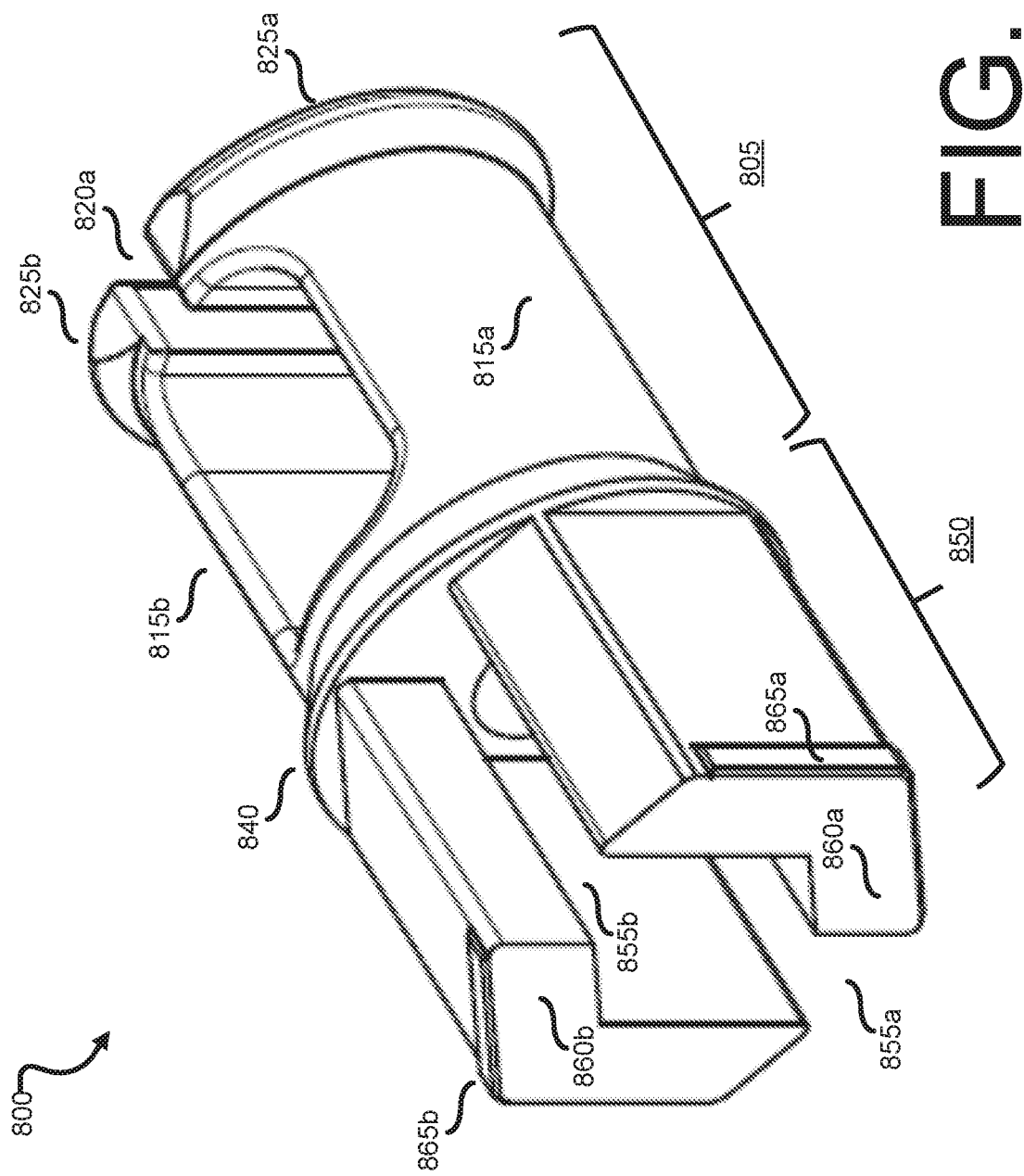

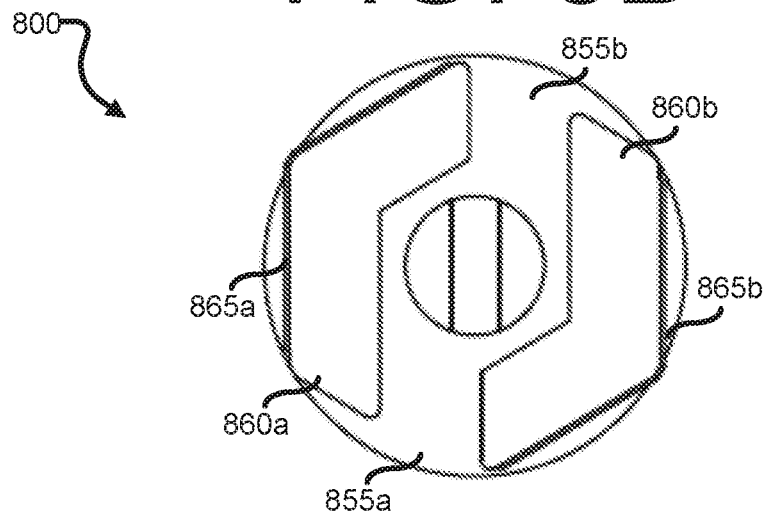
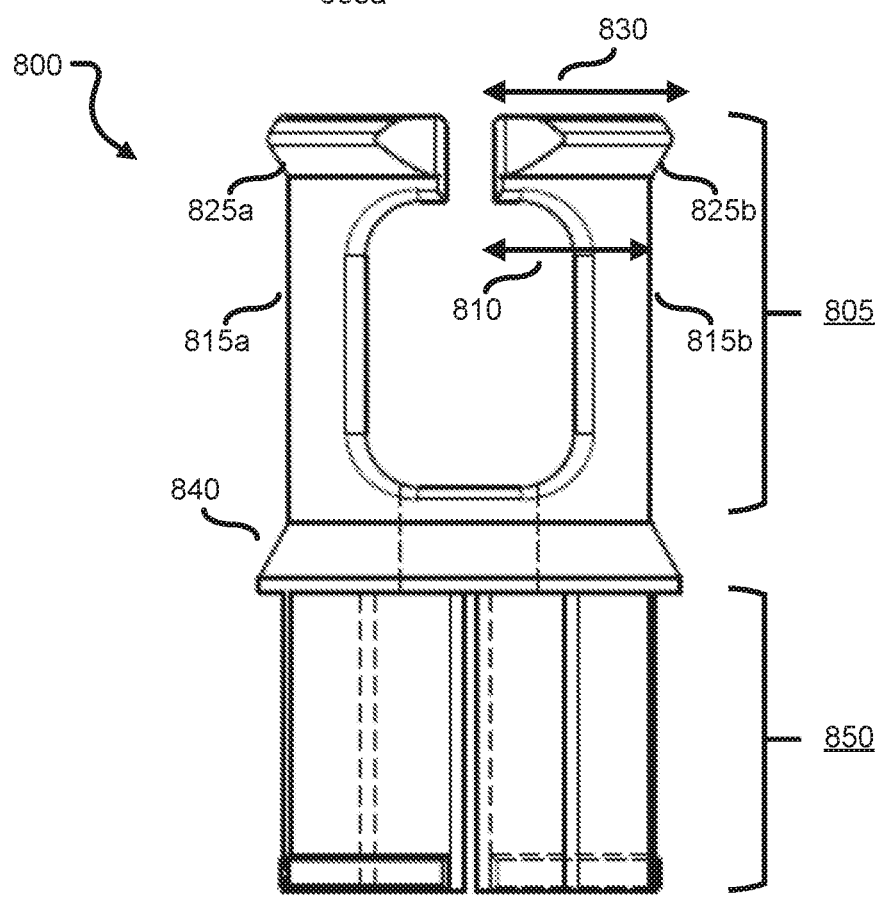

US 11,024,197 B2

ROBOTICS AND COMPUTING LEARNING PLATFORM WITH MULTI-LEVEL PROCESSING ARCHITECTURE

CROSS REFERENCE TO RELATED APPLICATION AND CLAIM OF PRIORITY

This application claims priority under 35 U.S.C. § 119(e) to U.S. Provisional Patent Application No. 62/717,222 filed Aug. 10, 2018. The above-identified provisional patent application is hereby incorporated by reference in its entirety.

TECHNICAL FIELD

This disclosure relates generally to devices for science, technology, engineering and math ("STEM") education. More specifically, this disclosure relates to a robotics and computing learning platform with a multi-level processing architecture and a component ecosystem for same.

BACKGROUND

Providing children, irrespective of their country, current economic circumstances, or gender, with technological education, and in particular, education on fundamental concepts of computing, has been recognized as an effective tool for socioeconomic advancement and empowering children from marginalized societal groups. However, the challenges associated with implementing computer education include, without limitation, providing students with access to computers or other suitable platforms for learning and developing computing skills. To learn computing, one needs a computer.

Providing every student with an internet connected full-function PC or tablet on which to learn and practice may, for a variety of reasons, such as economics and inadequate or unreliable networks, be impossible. Existing platforms for robotics education are generally tied to proprietary components and software, with an emphasis on expanding or maintaining the functionality of the computing platform through the purchase of new or replacement parts or software. The challenges of developing a computer and robotics learning platform with an architecture that enables students to expand and/or maintain the functionality of the system with commonly available items, and without relying on any baseline assumptions that the student has uninterrupted network connectivity or access to proprietary parts and software. From a technical standpoint, the challenges associated with developing a computer and robotics learning platform that can serve the needs of students of widely varying degrees of economic means and levels of network access, include, without limitation, supporting the processing of student programs written in easy-to-learn, high level programming languages, while also effectively managing the real-time functionality (for example, controlling motors, speakers, control logic for charging a lithium-ion battery) of the computing and robotics learning platform with currently available low-cost processors and microcontrollers. When using a single, low-power, inexpensive processor to support a computing environment in which students can write, in a high level programming language (such as a block-based beginner language), a program for controlling the operations of a physical device (for example, a set of stepper motors and sensors comprising part of a robotics kit), conventional system architectures can "freeze up" or fail to properly support real-time functionality of the learning platform.

SUMMARY

This disclosure provides a robotics and computing learning platform with multi-level processing architecture.

In a first embodiment, a puck for use with a robotics and computing learning platform includes a body having a circular edge surface defining a thickness of the body, a first face and a second face substantially parallel to the first face, a plurality of radial slots uniformly circumferentially spaced along the circular edge surface, and a plurality of circular extrusions disposed radially symmetrically on a face of the body, each circular extrusion having a height less than the thickness of the body and a first radius. Additionally, the puck includes a drive socket disposed radially symmetrically along a centerline of the puck, the drive socket having a wall structure comprising an extrusion of a first polygon, the first polygon inscribing a circle with the first radius, and a plurality of sockets disposed radially symmetrically on a face of the body, each socket of the plurality of sockets having a wall structure comprising an extrusion of a second polygon, the second polygon inscribing a circle with the first radius.

In a second embodiment, a side plate for a robotics kit includes a retaining ring and an arm attached at one end to the retaining ring and comprising a lattice of polygonal sockets, wherein the lattice of polygonal sockets comprises a plurality of sockets inscribing circles of a first radius.

In a third embodiment, a gear for a robotics kit includes a body having two substantially circular faces, an outer edge comprising a plurality of gear teeth, a plurality of circular extrusions disposed radially symmetrically on a face of the body, each circular extrusion having a height less than a thickness of the body and a first radius. Additionally, the gear includes a drive socket disposed radially symmetrically along a centerline of the gear, the drive socket having a wall structure comprising an extrusion of a first polygon, the first polygon inscribing a circle with the first radius and a plurality of sockets disposed radially symmetrically on a face of the body, each socket of the plurality of sockets having a wall structure comprising an extrusion of a second polygon, the second polygon inscribing a circle with the first radius.

In a fourth embodiment, a robotics platform includes a battery, a motor, and a removable first processing module which includes a first processor, a network interface for receiving programs, a first memory storing a high-level program for controlling an operation of the motor and a first interface communicatively coupling the removable first processing module to a second processing module. The robotics platform also includes a second processing module which includes a second processor, a second interface communicatively coupling the removable second processing module to the removable first processing module, an input-output interface communicatively coupling the second processing module to the motor and a second memory storing a low-level program for controlling a real-time functionality of the robotics platform. Further, the robotics platform includes a housing, the housing holding the battery, the motor, the first removable processing module and the second processing module.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 1A and 1B illustrate two views of a robotics and computing learning platform with a multi-level processing architecture, according to various embodiments of this disclosure;

FIG. 5 illustrates an example of interconnectivity between components for use with a robotics and computing learning platform, according to certain embodiments of this disclosure;

FIG. 7 illustrates an example of a device embodying a multi-level processing architecture, according to some embodiments of this disclosure; and FIGS. 8A, 8B and 8C illustrate multiple views of an example of an axle pin connector, according to various embodiments of this disclosure.

DETAILED DESCRIPTION

FIGS. 1A through 8C, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged computing or robotics learning platform.

Figure 1A:
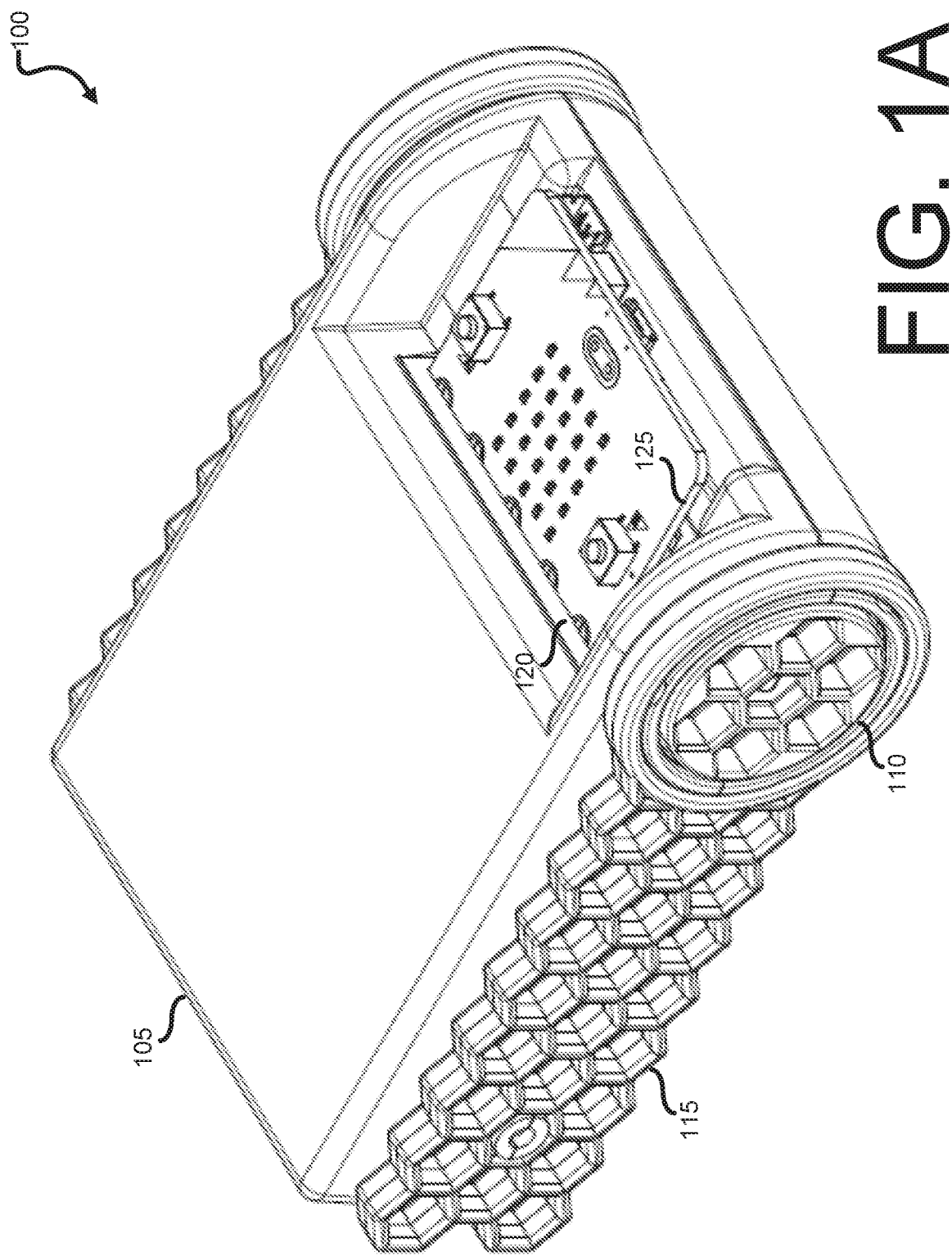

FIGS. 1A and 1B (collectively, "FIG. 1") illustrate two views of an example of a robotics and computing learning platform 100 with a multi-level processing architecture according to this disclosure. For convenience, components of robotics and computing learning platform shown in both FIGS. 1A and 1B are similarly numbered.

Referring to the non-limiting example of FIG. 1, platform 100 comprises a housing 105, one or more drive wheels 110 driven by motor(s) 130A and 130B within housing 105, additional components 115 for a component ecosystem of the robotics and computing learning platform, and a retaining slot 120 for holding a first processing module 125. In certain embodiments according to this disclosure, a student can load a program onto first processing module 125 (for example, a BBC Micro:Bit), and processing module 125 can be inserted into the retaining slot 120. The loaded program may be written in a high level language, or a programming environment (such as a JavaScript based, "block" type programming environment) familiar to and suitable for, a young or beginning computing student. The program may include operations to be performed by a component of platform 100, for example, controlling the rotation of drive wheel 110, and which involve real-time functionalities (for example, motor encoding) for which the student's program has not defined the control logic. In some embodiments, the first processing module 125 inserted through slot 120 may be communicatively coupled to a second processing module 135, which has a processor, and a memory containing program code, which when executed by the processor, can handle predetermined real-time functionalities of platform 100.

In certain embodiments according to this disclosure, housing 105 comprises a rugged shell capable of holding first and second processing modules 125 and 135 (which, can be embodied on development boards), sensors, one or more batteries, and other components of a robotics learning platform (for example, motors with rotary encoders capable of generating and reporting feedback regarding a motor shaft's angular position to a processor). According to certain embodiments, housing 105 may be formed from one or more pieces of a suitable material (for example, an injection molded or 3-D printed polymer) and have dimensions of approximately 4" (width)×6" (length) and 2" (depth). Other dimensions are possible and within the contemplated scope of this disclosure.

According to various embodiments, drive wheel 110 comprises a wheel connected to, and driven by a motor of platform 100 (for example, motor 130A) contained within housing 105. Drive wheel 110 includes a plurality of sockets whose walls define a lattice of polygons, wherein one or more polygons of the lattice inscribe a circle of a predetermined radius. In the non-limiting example of FIG. 1, the interior of drive wheel 110 includes a lattice of seven uniformly proportioned hexagonal sockets. In other embodiments, the lattice of polygons may comprise differently shaped sockets (for example, triangles or quadrilaterals), and a plurality of socket proportions (for example, not every socket is an extrusion of a similarly proportioned polygon). In some embodiments, drive wheel 110 may further include a flange or fillet disposed on the platform-side edge of drive wheel 110. An outwardly extruding flange or fillet can discourage removal of the drive wheel 110 from platform 100 and also discourage grit, dirt and other interferents from entering housing 105 in the area of a driveshaft connected to drive wheel 110.

In some embodiments, platform 100 includes additional components 115 of a component ecosystem for the platform 100. Additional components 115 may be made from any suitable material, including, without limitation, aluminum, carbon fiber, 3-D printed polymer, wood, or injection molded plastic. From a pedagogical standpoint, the effectiveness of a computing and robotics learning platform may be largely dependent on the extent to which it allows students to imagine and develop projects of interest to the students. A robotics learning platform which only allows students to control the operation of a stepper motor, may, by itself, be insufficient to maintain students' interest and enthusiasm. A component ecosystem, comprising parts which can be connected to drive wheel 110, allows students to build machines, structures and systems under the control of platform 100.

As shown in the non-limiting example of FIG. 1, retaining slot 120 is proportioned to retain first processing module 125 (for example, a development board) within platform 100. Depending on embodiments, slot 120 may be disposed at one end of a channel, thereby securing and protecting the processing module on three sides, while leaving one side of the processing module at least partially accessible so that students can access and view buttons, sockets and/or lights disposed on first processing module 125 (for example, a processing module having buttons and lights, such as an ARDUINO board).

Figure 2A:
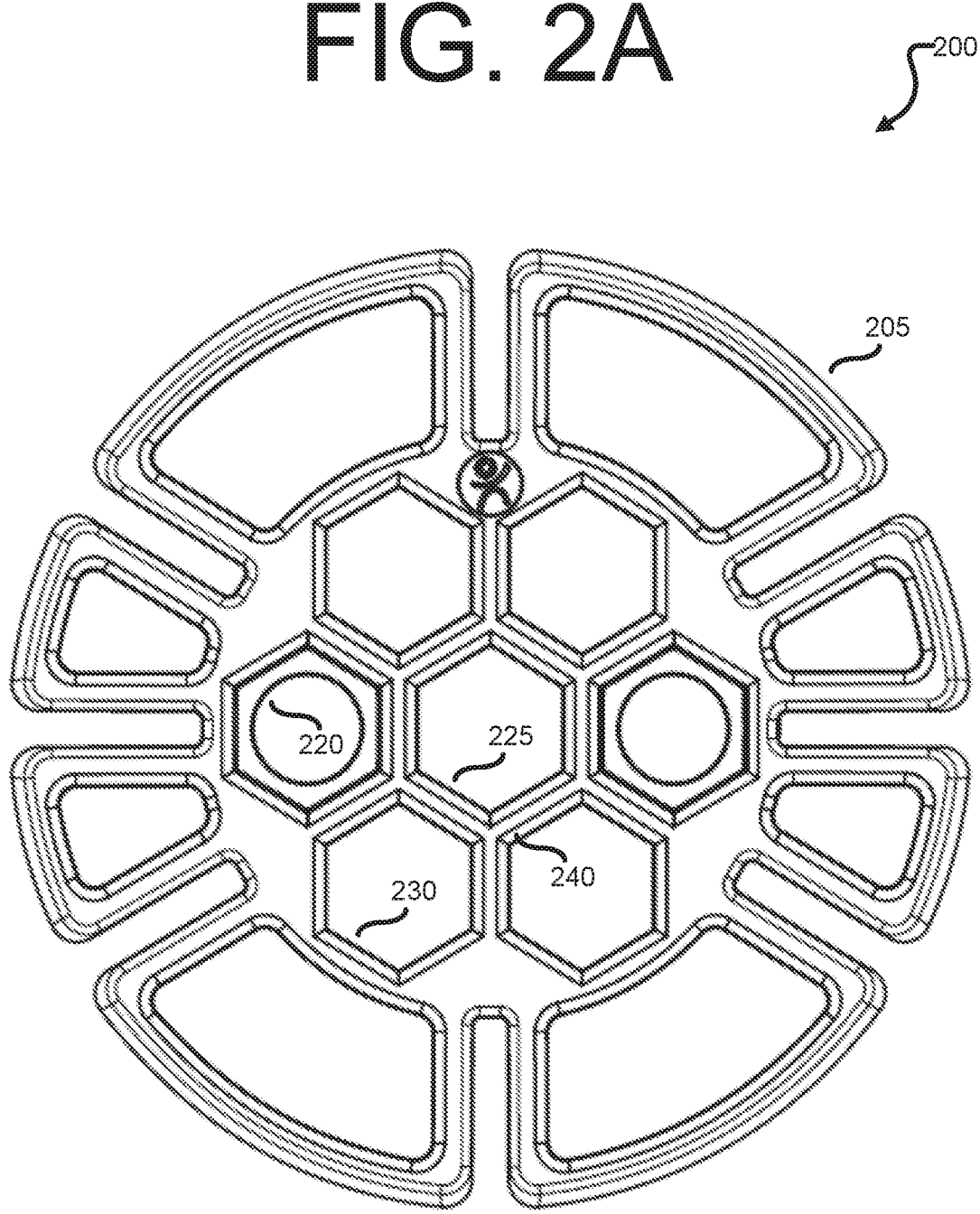
FIGS. 2A and 2B illustrate an example of a puck for use with a robotics and computing learning platform, according to some embodiments of this disclosure.
Figure 2B:
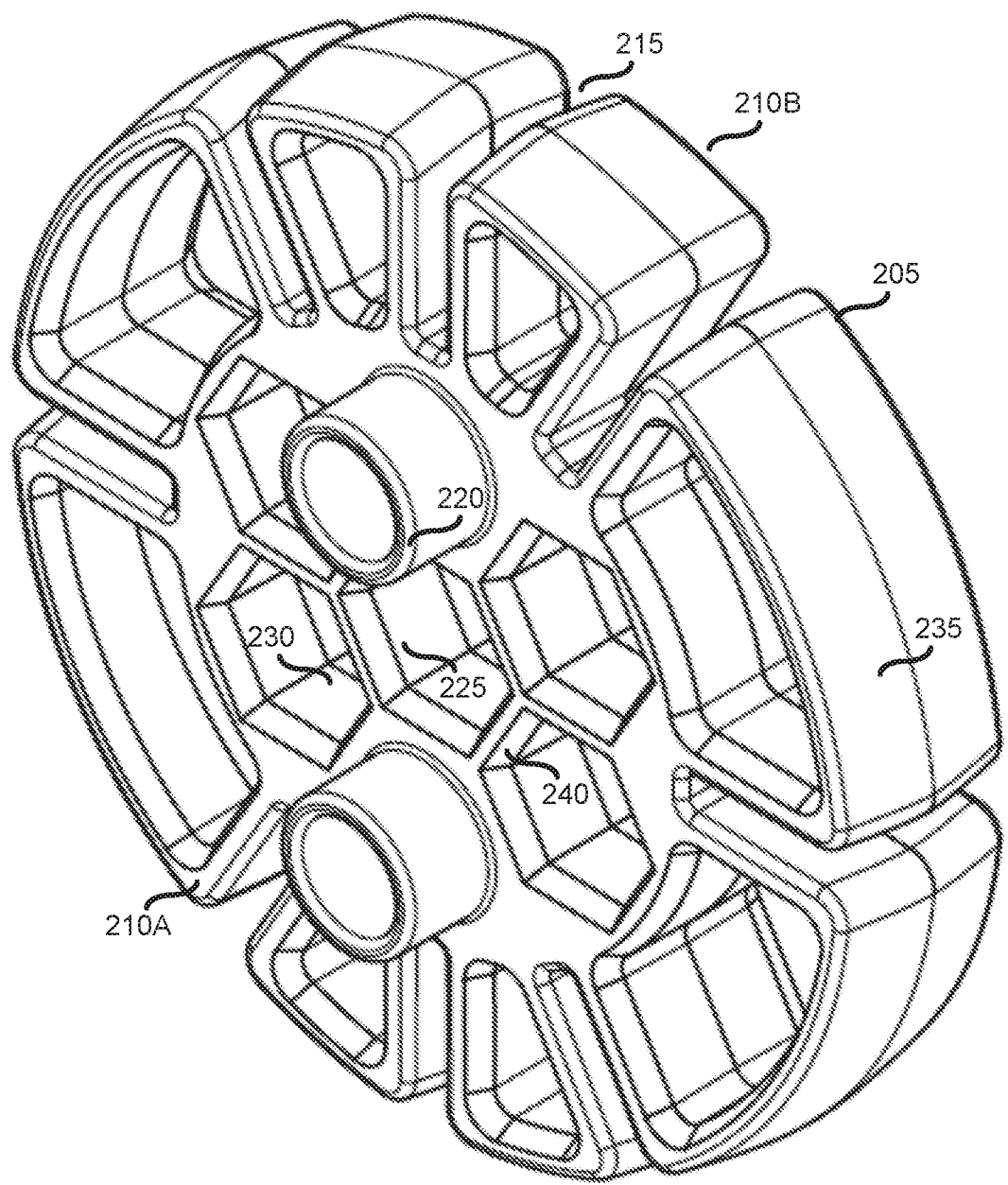

FIGS. 2A and 2B illustrate two views of an example of a puck 200 for use with a robotics and computing learning platform according to some embodiments of this disclosure. For convenience, structural elements of puck 200 which are visible in both views are numbered similarly in both FIGS. 2A and 2B.

According to some embodiments, puck 200 may serve as a drive wheel (for example, drive wheel 110 in FIG. 1) which is physically part of a computing and robotics learning platform (for example, platform 100 in FIG. 1). Puck 200 is constructed from any suitable material, including, without limitation, aluminum, brass, 3-D printed polymer, injection molded plastic or wood. According to certain embodiments, puck 200 may be part of a component ecosystem which can be connected to a computing and robotics learning platform to form larger machines under the control of the platform.

Referring to the non-limiting example of FIGS. 2A and 2B, puck 200 comprises a body having a circular edge surface 205 defining a thickness of the body, a first face 210A and a second face 210B, which is substantially parallel to first face 210A. Additionally, puck 200 can include a plurality of radial slots (including, for example, slot 215) disposed circumferentially along circular edge surface 205. In some embodiments, the radial slots are positioned uniformly, and spaced by a single angular interval. In some embodiments, the radial slots are positioned at two or more angular intervals, to facilitate the creation of a wider range of structures. In some embodiments, radial slot 215 may be proportioned to accept and retain a commonly found item (for example, a popsicle stick, or coffee stirrer). In this way, students may be able to use a combination of found materials in conjunction with one or more pucks 200 to build larger structures, such as a pinwheel, a pendulum, or a cylindrical paddlewheel (for example, by connecting two pucks by a set of longitudinally oriented popsicle sticks in radial slots 215).

In certain embodiments, puck 200 further comprises a plurality of circular extrusions (for example, circular extrusion 220) disposed symmetrically on a face of puck 200. Each of circular extrusions 220 may be proportioned to fit inside a socket of a puck 200 or another component in a component ecosystem (for example, as shown in FIG. 5 of the present disclosure). Additionally, circular extrusion 220 may be hollow and have interior and exterior radii proportioned to fit within or retain, commonly found materials. For example, in some embodiments, circular extrusion 220 may be hollow and have an interior diameter suitable for retaining a toothpick, pencil or cooking skewer, and an exterior diameter suitable for fitting snugly within a drinking straw or section of plastic tubing. Additionally, in embodiments where puck 200 comprises a plurality of circular extrusions 220, each circular extrusion may be positioned on puck 200 in a way that aligns with a lattice of sockets in the puck. In other embodiments, the plurality of circular extrusions 220 may be disposed in such a way as to circumscribe and retain found circular objects (for example, coins, washers, sections of pipe) having a commonly used exterior diameter (for example, 1 inch, or 20 mm).

According to the non-limiting example of FIGS. 2A and 2B, puck 200 further comprises a drive socket 225 disposed radially symmetrically along a centerline of the puck, wherein the drive socket has a wall structure which includes an extrusion of a first polygon that inscribes a circle having a first radius. In some embodiments, the first radius corresponds to an outer radius of a circular extrusion of the puck (for example, circular extrusion 220) or another item within the component ecosystem of a computing and robotics learning platform. In the example of FIGS. 2A and 2B, the first polygon is shown as a hexagon with a pair of flanged recesses. Accordingly, drive socket 225 can retain a rectangular extrusion (such as a popsicle stick) in the flanged recesses, as well as circular, triangular and hexagonal extrusions on the other faces of drive socket 225.

Other embodiments, including embodiments in which the polygon defining part or all of the wall structure of drive socket 225 is shaped in a way that can mate with, and retain extrusions of different polygons (for example, an eight pointed star, which can retain both square, octagonal and star-shaped extrusions) are possible and within the contemplated scope of this disclosure. In some cases, drive socket is proportioned to retain commonly found items, such as hex keys or drinking straws.

According to certain embodiments, puck 200 also includes one or more sockets (for example, socket 230 in FIGS. 2A and 2B) part or all of whose wall structure comprises an extrusion of a polygon. In some embodiments, the polygon defining some or all of the wall structure of socket 230 may be the same as the polygon defining some or all of the wall structure of drive socket 225. Further, in some embodiments, sockets 230 are disposed on puck 200 at locations mapping to a region of polygons. In certain embodiments, arranging the sockets according to a lattice of polygons enables the parts within a component ecosystem for the computing and robotics learning platform to mate with puck in a variety of configurations. In this way, the creative possibilities of the platform and component ecosystem are enhanced.

According to various embodiments, socket 230 further comprises a retaining region 240. which is configured to provide an interface between a flange of a connector (for example, the axle connector 800 described with reference to FIG. 8 of this disclosure). In this non-limiting example, retaining region 240 comprises a surface which is, at a minimum, substantially normal (for example, having an angular difference of 30 degrees or more) to a wall structure of socket 230 comprising an extrusion of a polygon. Referring to the non-limiting example of FIG. 2, the interface provided by retaining region 240 is configured to restrict a connector from moving axially within socket 230. In some embodiments, socket 230 and retaining region 240 are configured and proportioned such that, while axial movement of a connector retained within socket 230 is restricted, a connector is free to move rotationally (for example, as an axle) within socket 230.

According to certain embodiments, puck 200 may further comprise one or more edge profiles 235 on the circular edge surface 205. In some embodiments, edge profile 235 comprises a fillet, or groove which can be useful for retaining a rubber band, string, or other found item which can be used as a drivechain in a system created by a student. According to other embodiments, edge profile 235 may be proportioned to allow other parts within a component ecosystem (for example, side plate 300 shown in FIG. 3) to "clip on to" or otherwise attach to, puck 200.

Figure 3:
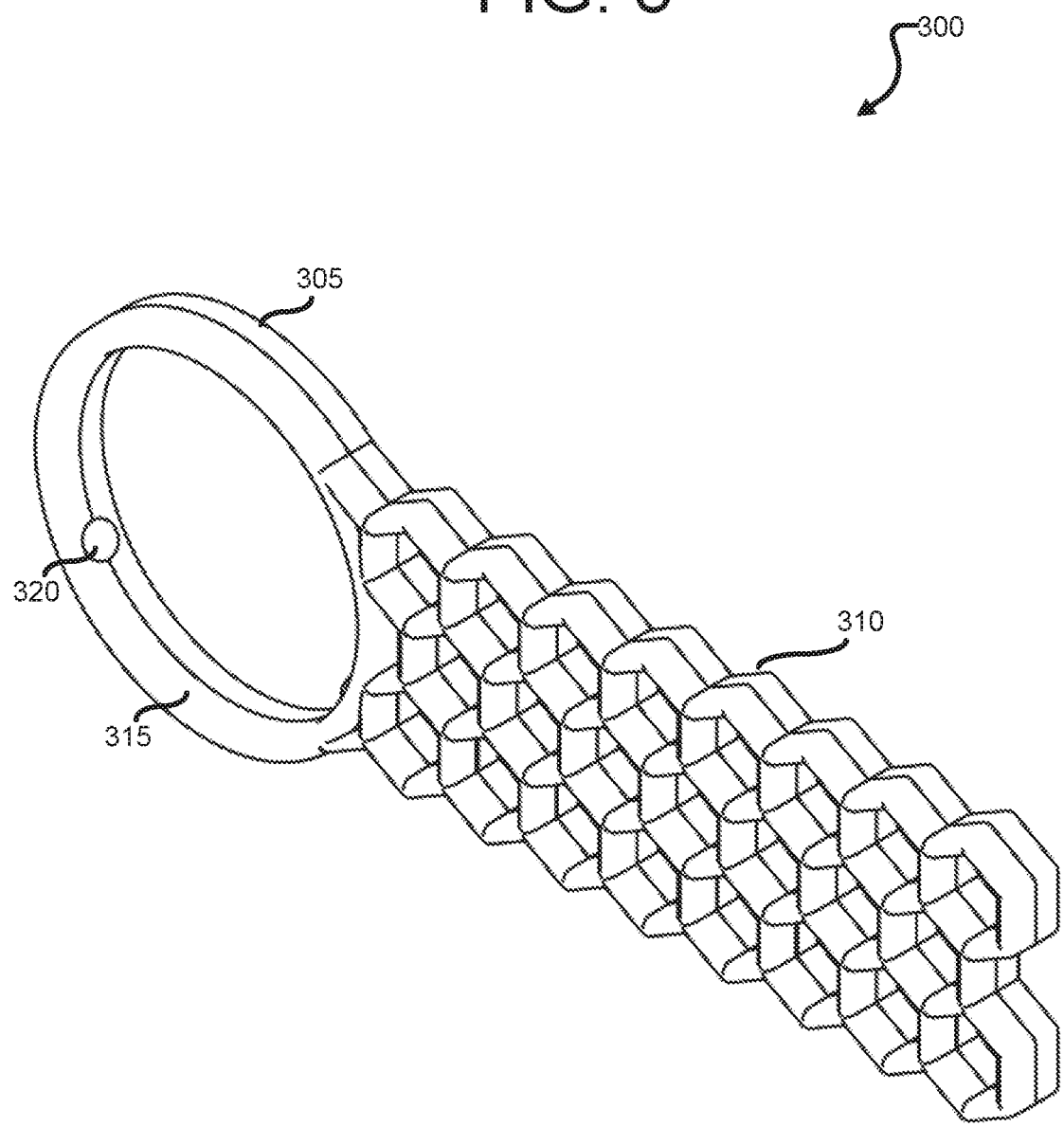
FIG. 3 illustrates an example of a side plate which is part of a component ecosystem of a robotics and computing learning platform, according to certain embodiments of this disclosure.

FIG. 3 illustrates an example of a side plate 300 which is part of a component ecosystem of a robotics and computing learning platform according to certain embodiments of this disclosure. Side plate 300 is constructed from any suitable material, including, without limitation, recycled plastic, wood, bamboo, medium density fiberboard (MDF), injection molded plastic, metal or 3-D printed polymers.

Referring to the non-limiting example of FIG. 3, side plate 300 comprises a retaining ring 305 and an arm 310.

According to certain embodiments, retaining ring 305 comprises a curved section (for example a ring, polygon, a "c-shape" or other open shape) of material proportioned to retain one or more items (for example a puck or drive wheel) within an interior region of the retaining ring. In some embodiments, retaining ring 305 is configured to fixedly retain the item such that the retained item does not move relative to retaining ring 305 and side plate 300. In the non-limiting example of FIG. 3, fixed retention of an item within retaining ring 305 is achieved by a locking pin 320 (which prevents rotational movement) and one or more convex interior surfaces 315, which mate with a corresponding exterior surface (for example, a fillet or groove) of the retained item. In other embodiments, fixed retention may be achieved by using a retaining ring having corners, or other non-radially symmetric shape. In certain embodiments, retaining ring 305 may be configured (for example, by removing locking pin 320, or replacing locking pin 320 with a ball bearing) to permit rotational movement of side plate 300 relative to the retained item, while discouraging "in and out" movement along an axis of rotation of the retained item.

In certain embodiments, arm 310 comprises one or more extensions connected to retaining ring 305. In the non-limiting example of FIG. 3, arm 310 includes a lattice of polygonal sockets proportioned to retain other parts (for example, circular extrusion 220 of puck 200) within a component ecosystem. The lattice of polygonal sockets may be proportioned to retain commonly found objects, such as hex keys, drinking straws, or chopsticks. While not shown FIG. 3, arm 310 may also include one or more circular extrusions (for example, circular extrusion 220) proportioned according to one or more dimensional standards of a component ecosystem.

Figure 4A:
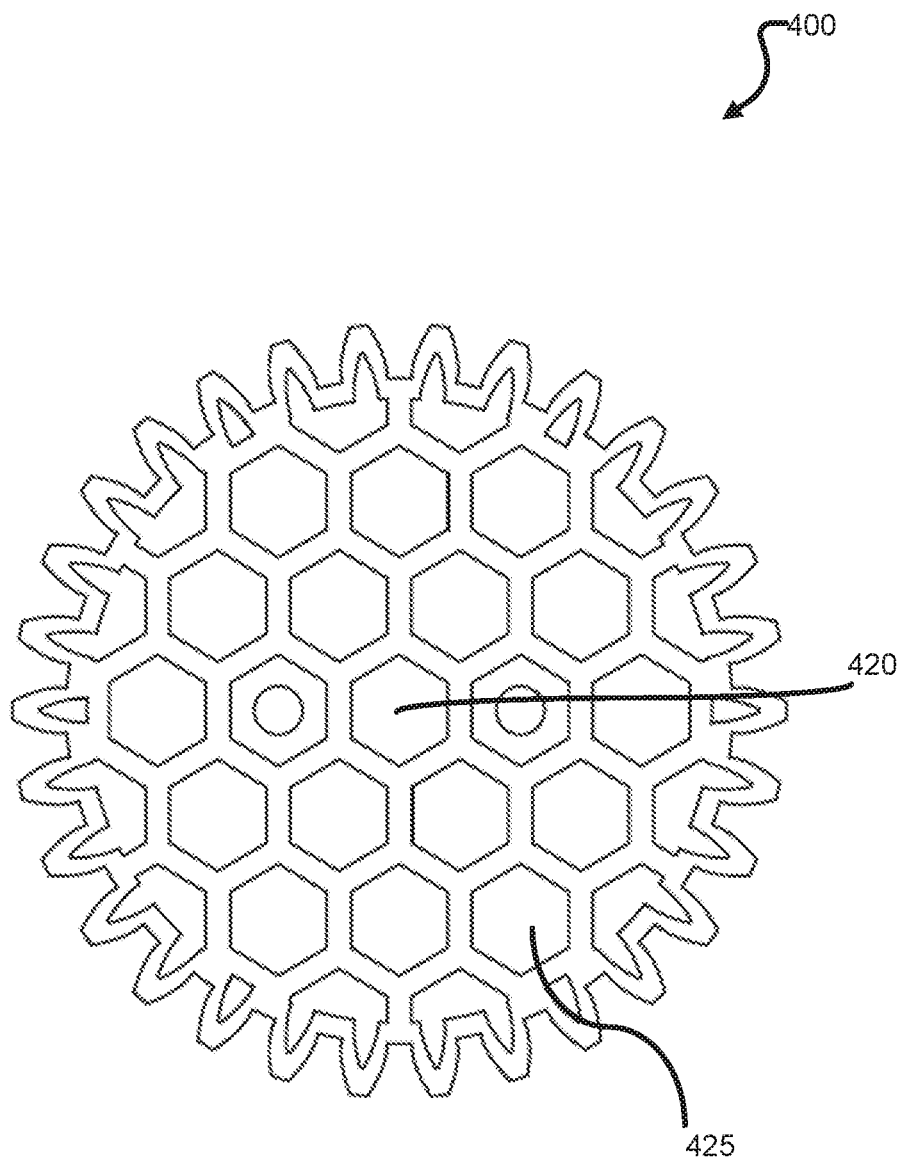
FIGS. 4A and 4B illustrate an example of a gear which is part of a component ecosystem of a robotics and computing learning platform, according to certain embodiments of this disclosure.
Figure 4B:
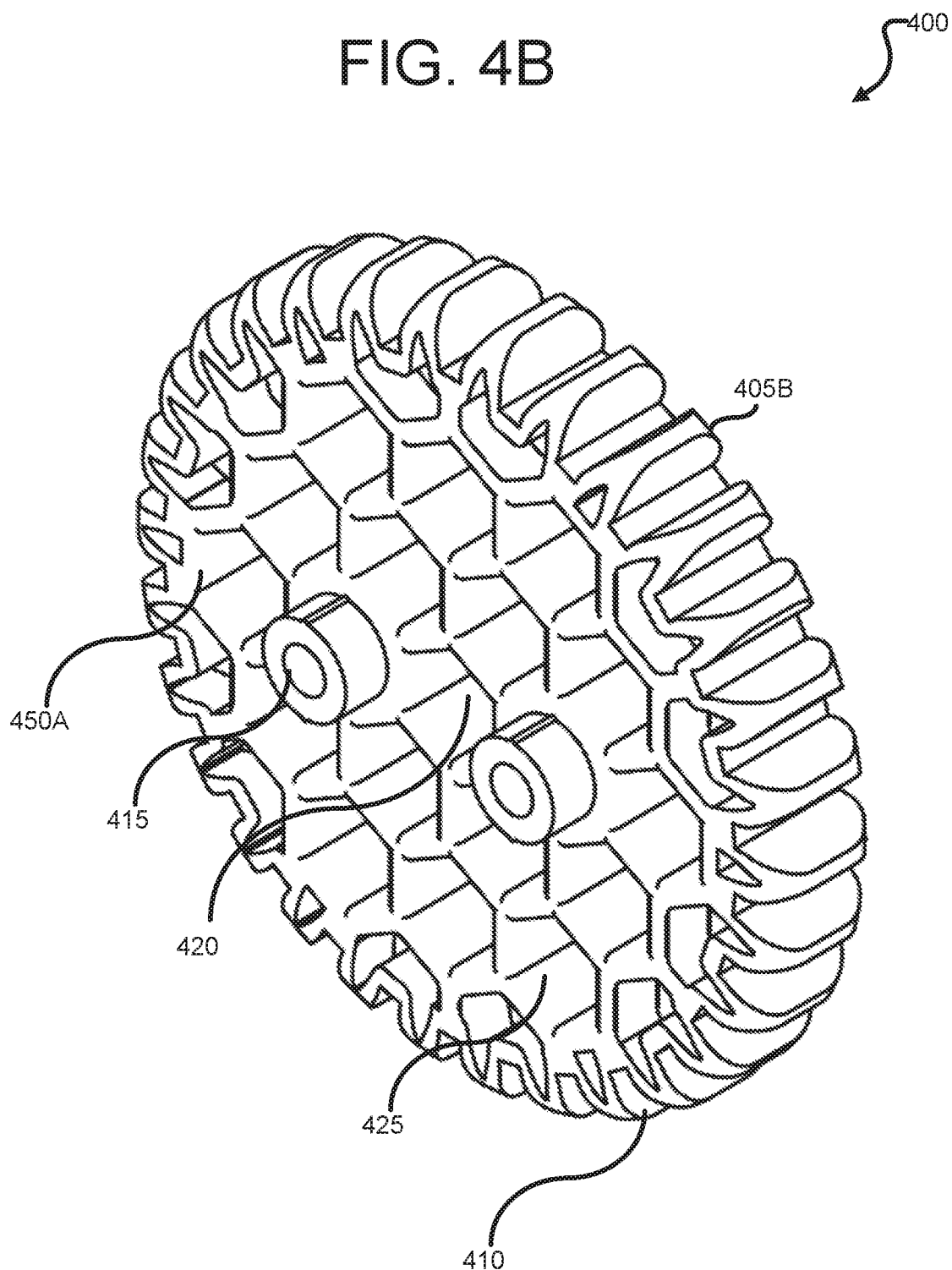

FIGS. 4A and 4B (collectively, "FIG. 4") illustrate an example of a gear 400 which is part of a component ecosystem of a robotics and computing learning platform according to certain embodiments of this disclosure. Gear 400 is constructed out of any suitable material, including, without limitation, wood, MDF, plastic or metal.

Referring to the non-limiting example of FIGS. 4A and 4B, gear 400 comprises a body having two substantially parallel faces 405A and 405B. In some embodiments, gear 400 includes one or more circular extrusions (for example, extrusion 415) disposed on face 405A or 405B. According to certain embodiments, the one or more circular extrusions may be proportioned to be retained within a lattice of polygonal sockets found on another gear or item within the component ecosystem. Further, gear 400 includes an outer edge 410 comprising a plurality of gear teeth.

As shown by the non-limiting example of FIG. 4, gear 400 further includes a drive socket disposed along a centerline of gear 400. According to certain embodiments, the drive socket has a wall socket comprising an extrusion of a first polygon, which inscribes a circle of a predetermined radius. In some embodiments, to facilitate interconnectivity between parts within the component ecosystem, the radius of the inscribed circle corresponds to the radius of extrusion 415. According to certain embodiments, the drive socket may comprise an extrusion of multiple coaxial polygons (for example, a hexagon and a thin rectangle) to allow a variety of objects, including found objects, (for example, a hex key and a popsicle stick to function as drive shafts for the gear. Additionally, while not shown in FIG. 4, gear 400 may also include, on one of the parallel faces of the gear, a cylindrical recess configured to retain widely available found objects (for example, 22 mm diameter bearings commonly used in motors, toys (e.g., "fidget spinners") and sporting equipment, such as roller skates and skateboards.) In some embodiments, gear 400 further comprises a plurality of sockets disposed on a face of the body, each socket 425 of the plurality of sockets having a wall structure comprising an extrusion of a polygon, the polygon inscribing a circle with a standard radius. Additionally, in some embodiments, the plurality of sockets are disposed at locations mapping to regions of a lattice of polygons. In one, non-limiting embodiment, the lattice of polygons may be comprised of equally sized hexagons, and have a honeycomb-like appearance. According to certain embodiments, drive socket 420 comprises part of the lattice of polygons.

FIG. 5 illustrates an example of interconnectivity between components for use with a robotics and computing learning platform, according to certain embodiments this disclosure. As shown in the non-limiting example of FIG. 5, parts within a component ecosystem according to embodiments of this disclosure have multiple surfaces with geometric commonalities (for example, the radius of a circular extrusion 415 on gear 400, and the radius of the circles inscribed by the polygonal sockets of side plate 300, which allow one part within the component ecosystem to retain, or attach to, another part, thereby allowing students to build multi-part structures. Additionally, while not shown in FIG. 5, parts within component ecosystems according to embodiments of this disclosure include surfaces with geometric commonalities to widely available found objects (for example, drinking straws, hex keys, popsicle sticks, pencils, etc.) so that components can also be interconnected using found objects. This allows students without access to, or the means to obtain, additional robotics and computing learning kits to also build complex machines from a set of components which is small, or potentially damaged.

Figure 6:
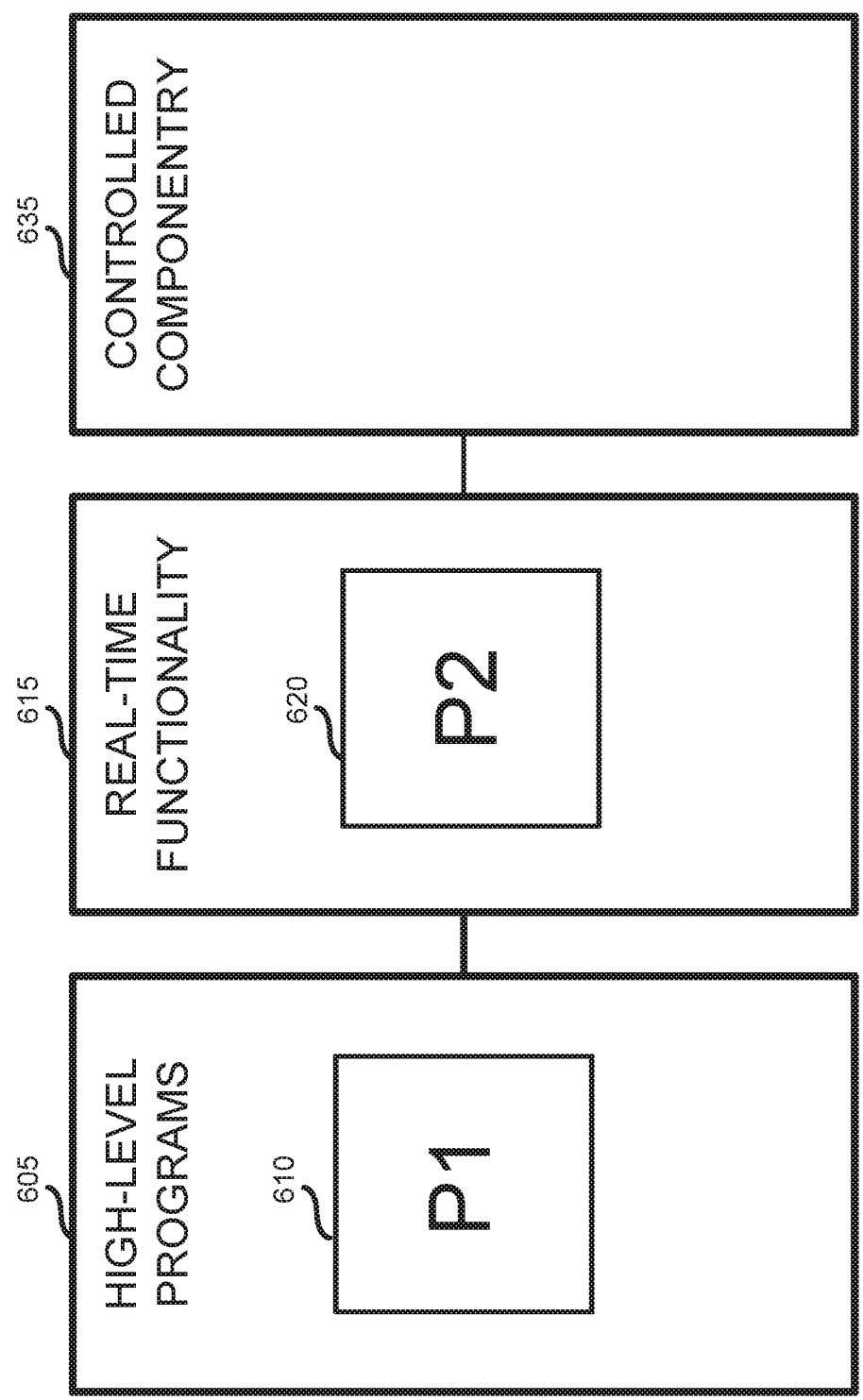
FIG. 6 illustrates an example of a multi-level processing architecture according to some embodiments of this disclosure.

FIG. 6 illustrates an example of a multi-level processing architecture 600 according to some embodiments of this disclosure.

The technical challenges associated with designing a single platform for computing and robotics education suitable for students across a wide range of experience levels include supporting the popular high-level programming languages which are relevant and comparatively easy to learn, being able to implement the real-time functionality of a robotics platform (such as managing the charging of certain types of batteries or controlling encoders for stepper motors), and at the same time, restrict access to program space used for lower-level and real-time functionalities of the computing platform. Where platform cost is not an issue, and the platform can be designed around a powerful processor and a feature-rich operating system, these technical challenges can be largely addressed through the platform's operating system (OS), and techniques such as partitioning or "sandboxing" programs associated with real-time, or low-level functionalities, which it is desirable to keep out of the reach of beginning students.

However, when the design goals of the computing and robotics learning platform include minimizing component costs to make the platform affordable for a worldwide student pool, much smaller processors (such as found on teaching boards such as the BBC Micro:Bit) are required, and solutions to the above-described technical problems premised on powerful processors become untenable. For example, while it is possible for devices with comparatively small processors to run Java programs controlling operations of a robotics teaching platform, isolating the program space associated with the real-time functionality using "big processor" techniques such as partitioning or sandboxing introduce significant latency in the operation of the platform. The latency caused by trying to implement "big processor" solutions to the design challenges of a computing and robotics teaching system using small, low-cost processors negatively affects the user experience, and in some cases, can render the system inoperative.

Referring to the non-limiting example of FIG. 6, aspects of a solution to the technical challenges of realizing, through low-power, low cost processors (for example, the ARM® CORTEX™ CPU) a computing and robotics learning platform which supports running programs written in high-level programming languages, the real-time functionality of a robotics learning platform, and isolation of program spaces associated with low-level and real-time functionality are shown. Rather than attempt to achieve these design goals with a single processing module built around a single processor, certain embodiments according to this disclosure solve the technical challenges of implementing an effective computing and robotics platform without latency in real-time functionality by employing a multi-level processing architecture.

According to certain embodiments of this disclosure, a computing and robotics learning platform includes, at a first processing level, a first processing module 605 which includes a first processor 610, a network interface (such as a USB connection, or BLUETOOTH® Low Energy receiver) through which student programs can be received, and a serial connection to a second processing module 615. As shown in the non-limiting example of FIG. 6, first processing module 605 supports high-level programming languages, and first processor 610 can run programs written in high level programming languages loaded into a memory of first processing module 605, and pass high-level program outputs controlling components (for example, motors, sensors, encoders and components connected through expansion slots in the computing and robotics learning platform) via a serial connection to second processing module 615.

To convert, in real-time, high-level commands from first processing module 605 (for example, an instruction to turn a stepper motor 30 degrees counterclockwise) in the specified action by one or more component of controlled components 625, additional processing by second processing module 615 is required. This additional processing is, in certain embodiments performed by second processor 620 of second processing module 615.

In the non-limiting example of FIG. 6, first processing module 605 is physically distinct from second processing module 615. Thus, while "big processor" solutions to the above-described technical challenges of implementing a computing and robotics learning platform implement a single-system architecture, certain embodiments according to this disclosure solve these technical challenges through a "system of systems" design paradigm, using two or more processing modules.

FIG. 7 illustrates an example of a device 700 embodying a multi-level processing architecture according to some embodiments of this disclosure.

Referring to the non-limiting example of FIG. 7, device 700 may comprise the components shown in FIG. 7, housed in a suitably rugged case (for example, housing 105 in FIG. 1).

According to certain embodiments, device 700 includes a high level processing module 705. In some embodiments, high level processing module 705 comprises a microprocessor or microcontroller development board (for example, a BBC Micro:Bit, or a Raspberry Pi) which can be inserted and removed from the device through one or more slots (for example, slot 120 in FIG. 1) provided in the device housing. According to certain embodiments, high level processing module 705 includes a low-power processor 710 which is capable of running programs written in popular, high-level programming languages, generating outputs for controlling one or more real-time functionalities of the device, and receiving and processing inputs from sensors or devices connected to device 700 through expansion slot 795.

As shown in the non-limiting example of FIG. 7, high level processing module 705 comprises a memory 715 for storing, inter alia, an operating system (OS), and one or more programs for controlling the operation of real-time functionalities of device 700. According to some embodiments, memory 715 may also comprise files for maintaining the operability of device 700 as a platform for teaching computing and robotics. For example, in some embodiments, memory 715 may be pre-loaded with files (for example, G-code files for a 3-D printer or CNC machine) for making additional or replacement parts belonging to a component ecosystem associated with device 700.

In some embodiments according to this disclosure, high-level processing module 705 further comprises a universal serial bus (USB) interface 720 for interfacing with other computing systems. Additionally, according to certain embodiments, high-level processing module 705 includes a Bluetooth or Bluetooth Low Energy interface, and one or more LEDs 730 which can be controlled by a student program loaded into memory 715.

As shown in the non-limiting example of FIG. 7, high level processing module 705 is communicatively connected (for example, by a serial bus) to real-time processing module 750. According to certain embodiments, high level processing module 705 and real-time processing module 750 are embodied on separate cards, with high-level processing module 705 being readily removable to facilitate upgrades and experimentation with different processors.

In some embodiments, real-time processing module 750 includes processor 755, and memory 760. Memory 760 contains program code, which when executed by processor 755, causes real-time processing module 750 to receive, from high level processing module 705, high-level commands for controlling one or more real-time functionalities of components of device 700, perform low-level processing tasks associated with the execution of the high-level commands to obtain component-level control signals, and transmit the component-level control signals to one or more components of device 700. Similarly, memory 760 contains program code, which when executed by processor 755, causes real-time processing module 750 to receive, from a component of device 700 component-level signals (for example, temperature sensor data) associated with a real-time functionality of device 700, perform processing tasks associated with the conversion of component-level signals to program inputs, and transmit program inputs to high-level processing module 705.

According to certain embodiments, device 700 includes one or more sensors 765 (for example, gyros, microphones, or thermometers) for providing inputs to programs executing at high-level processing module 705. In some embodiments, device 700 includes one or more motors 770, which, in certain embodiments, are actuated by quadrature encoders 775. In the non-limiting example of FIG. 7, one motor of motors 770 drives a drive wheel (for example, drive wheel 110 in FIG. 1) disposed on an exterior portion of device 700. According to certain embodiments, device 700 also includes a battery 780 for powering the system. In this non-limiting example of FIG. 7, battery 780 is a rechargeable lithium-ion battery, and real-time processing module 750 manages the charge rate of battery 780.

FIGS. 8A, 8B and 8C (collectively, "FIG. 8") illustrate multiple views of an example of an axle connector 800, according to various embodiments of this disclosure. For convenience, elements of axle connector 800 which are visible in multiple views are identified with the same numbers.

Referring to the non-limiting example of FIG. 8, axle connector 800 comprises one example of a connector component of a component ecosystem for a robotics and computer learning platform (for example, platform 100 in FIG. 1), configured to be retained within a first socket (for example, socket 230) of a first component of the component ecosystem (for example, puck 200 in FIG. 2) such that axial movement of the connector within the first socket is restricted, but rotational movement of the connector around a shared center axis of axle connector 800 and the first socket of the first component is substantially unrestricted.

Further, according to certain embodiments, axle connector 800 is configured to be retained with a second socket of a second component of the component ecosystem (for example, side plate 300 in FIG. 3, or gear 400 in FIG. 4). According to certain embodiments, axle connector 800 is configured to be retained by the second socket such that both axial movement of the connector within the second socket, and rotational movement of the connector within the second socket are restricted.

In certain embodiments according to this disclosure, axle connector 800 enables the connection of components within the component ecosystem to create compound mechanical structures. As one example, axle connector 800 can be used to connect a first gear (for example, gear 400) to two or more smaller gears to build a planetary gear system. By the same token, a plurality of axle connectors 800 can be used to hold components in a fixed spatial relationship to each other. For example, two or more axle connectors 800 could be used to retain a second gear on the surface of a first gear, thereby creating a compound gear.

According to various embodiments, axle connector 800 comprises a first portion 805, which is configured to fit within a socket of another component of a component ecosystem, wherein the socket comprises an extrusion of a polygon, the polygon inscribing a circle of a first radius. According to various embodiments, first portion 805 comprises one or more radially deflectable portions (for example, first radially deflectable portions 815a and 815b separated by first and second sidewall cuts 820a and 820b). While in this non-limiting example, first portion 805 comprises two equally proportioned radially deflectable portions 815a and 815b, other embodiments (for example, a single radially deflectable portion with a single sidewall cut) with greater or fewer radially deflectable portions are within the contemplated scope of this disclosure. According to various embodiments, first and second sidewall cuts 820a and 820b are dimensioned (for example, having a cut width and slight taper) to retain commonly found materials (for example, popsicle sticks or coffee stirrers) suitable for incorporation in a project utilizing the computing and robotics platform according to this disclosure.

Referring to the illustrative example of FIG. 8, the radially deflectable portions of first portion collectively define a substantially cylindrical section with an exterior radius 810 equal to or less than the first radius of the circle inscribed by the polygonal socket. According to various embodiments, first portion 805 comprises one or more retaining flanges (for example, retaining flanges 825a and 825b) which define a circular section of second radius 830, wherein second radius 830 is greater than both the first radius of the socket and exterior radius 810 defined by radially deflectable portions 815a and 815b. In some embodiments, axle connector 800 is constructed of a material (for example, plastic, or polished metal) providing a low friction exterior surface and sufficient flexibility for radially deflectable portions 815a and 815b to be compressed inwards to allow retaining flanges 825a and 825b to pass through the socket and upon exiting the socket, expand and engage with a retaining region (for example, retaining region 240 in FIG. 2) of the component to restrict axial motion of first portion 805 within the socket, while at the same time, allowing first portion 805 to rotate within the socket.

As shown in the illustrative example of FIG. 8, first portion 805 of axle connector 800 is connected to a second portion 850 by a common flange 840. According to various embodiments, common flange 840 restricts the insertion depth of axle connector 800 within sockets of the components connected by axle connector 800.

According to various embodiments, second portion 850 comprises one or more radially compressible extrusion sections (for example, first radially compressible extrusion section 860*a* and second radially compressible extrusion section 860*b*) separated by one or more sidewall cuts (for example, third sidewall cut 855*a* and fourth sidewall cut 855*b*). In some embodiments, each radially compressible extrusion section has a sidewall structure comprising portions of the same extruded polygon (for example, a hexagon) as the socket with which axle connector 800 is configured to interface with. According to various embodiments, third and fourth 855*a* and 855*b* are likewise dimensioned to facilitate retaining commonly found materials (for example, popsicle sticks or coffee stirrers) suitable for incorporation in a project utilizing the computing and robotics platform according to this disclosure. By sharing a common corner structure as the sidewalls of the socket in which second portion 850 is retained, the one or more radially compressible extrusion sections restrict rotation of second portion 850 within the socket.

According to various embodiments, the distal end of one or more radially compressible extrusion sections comprises a retaining flange (for example retaining flanges 865*a* and 865*b*) configured to interface with a retaining region of a component and restrict second portion 850 from moving axially within the socket.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A puck comprising:
    a body having a circular edge surface defining a thickness of the body, a first face and a second face substantially parallel to the first face;
    a plurality of radial slots circumferentially spaced along the circular edge surface and extending to the exterior of the puck;
    a plurality of circular extrusions disposed radially symmetrically on a face of the body, each circular extrusion having a height less than the thickness of the body, and a first radius;
    a drive socket disposed radially symmetrically along a centerline of the puck, the drive socket having a wall structure comprising an extrusion of a first polygon, the first polygon inscribing a circle with the first radius; and
    a plurality of sockets disposed radially symmetrically on a face of the body, wherein a first socket of the plurality of sockets has a wall structure comprising an extrusion of a second polygon, the second polygon inscribing a circle with the first radius,
    wherein the puck comprises a part of a component ecosystem of a robotics and computing learning platform, and
    wherein the puck can be connected to another part of the component ecosystem by at least one of a circular extrusion of the plurality of circular extrusions or a socket of the plurality of sockets.

2. The puck of claim 1, wherein the circular edge surface comprises a circular edge with a fillet.

3. The puck of claim 1, wherein the first polygon and the second polygon are the same shape.

4. The puck of claim 1, wherein the plurality of circular extrusions are spaced to align with polygons of the lattice of first polygons.

5. The puck of claim 1,
    wherein the wall structure of the first socket comprises a retaining region, the retaining region comprising a surface substantially normal to a portion of the wall structure comprising the extrusion of the second polygon, and
    wherein the retaining region is configured to provide an interface between a flange of a connector and the puck, the connector comprising a substantially cylindrical section with an exterior radius equal to or less than the first radius.

6. The puck of claim 5, wherein the interface provided by the retaining region is configured to permit the connector to rotate within the first socket, and
    wherein the interface provided by the retaining region is configured to restrict the connector from moving axially within the first socket.

7. The puck of claim 1,
    wherein a first circular extrusion of the plurality of circular extrusions comprises a flange configured to be held by a retaining region of a socket comprising an extrusion of the first polygon.

8. The puck of claim 1, wherein neighboring slots of the plurality of radial slots are positioned at two or more angular intervals.

* * * * *